U S 0 0 8 9 4 8 7 7 2 B 2

US008948772B2

(12) United States Patent
Eerolainen et al.

(10) Patent No.: US 8,948,772 B2
(45) Date of Patent: Feb. 3, 2015

(54) APPARATUS AND METHOD FOR REQUESTING UPLINK RADIO RESOURCES

(75) Inventors: Lauri Johannes Eerolainen, Paimio (FI); Kalle Petteri Kela, Kaarina (FI)

(73) Assignee: Nokia Corporation, Espoo (FI)

( * ) Notice: Subject to any disclaimer, the term of this patent is extended or adjusted under 35 U.S.C. 154(b) by 231 days.

(21) Appl. No.: 13/574,350

(22) PCT Filed: Feb. 2, 2010

(86) PCT No.: PCT/IB2010/050458
§ 371 (c)(1),
(2), (4) Date: Jul. 20, 2012

(87) PCT Pub. No.: WO2011/095843
PCT Pub. Date: Aug. 11, 2011

(65) Prior Publication Data
US 2012/0295652 A1 Nov. 22, 2012

(51) Int. Cl.
*H04W 72/00* (2009.01)
*H04B 7/00* (2006.01)
*H04W 72/04* (2009.01)
*H04W 72/12* (2009.01)
*H04W 74/08* (2009.01)
*H04W 84/18* (2009.01)

(52) U.S. Cl.
CPC ...... *H04W 72/0413* (2013.01); *H04W 72/1284* (2013.01); *H04W 74/0833* (2013.01); *H04W 84/18* (2013.01)
USPC .................. 455/452.1; 455/509; 455/67.11; 455/434

(58) Field of Classification Search
USPC ........ 455/509, 452.1, 452.2, 414.3, 450, 500, 455/67.11, 434, 515, 68, 67.16, 512; 370/329, 312, 328
See application file for complete search history.

(56) References Cited

U.S. PATENT DOCUMENTS

2008/0316959 A1* 12/2008 Bachl et al. .................. 370/329
2010/0202420 A1* 8/2010 Jersenius et al. ............. 370/337
(Continued)

FOREIGN PATENT DOCUMENTS

| CN | 101352089 A | 1/2009 |
| EP | 1816793 A1 | 8/2007 |
| WO | 2010/002307 A1 | 1/2010 |
| WO | WO-2010002307 A1 | 1/2010 |

OTHER PUBLICATIONS

"3rd Generation Partnership Project; Technical Specification Group Radio Access Network; Evolved Universal Terrestrial Radio Access (E-UTRA); Physical layer procedures (Release 8)", 3GPP TS 36.213, V8.8.0, Sep. 2009, pp. 1-77.
(Continued)

*Primary Examiner* — John J Lee
(74) *Attorney, Agent, or Firm* — Mintz Levin Cohn Ferris Glovsky and Popeo, P.C.

(57) ABSTRACT

An example apparatus is provided that may provide for transmission of a first scheduling request and increment an alert counter upon transmitting the request. The apparatus may then determine if uplink resources have been received and, if not, provide for transmission of a second scheduling request. The apparatus may increment the alert counter in response to transmitting the second scheduling request. The apparatus may also provide for transmission of an indication that the alert counter has reached an alert counter threshold, in response to which, the apparatus may receive dummy uplink resources that may cause the alert counter to reset.

20 Claims, 6 Drawing Sheets

(56) References Cited

U.S. PATENT DOCUMENTS

2010/0322329 A1* 12/2010 Yoo et al. .................. 375/260
2013/0028221 A1* 1/2013 Seo et al. .................. 370/329

OTHER PUBLICATIONS

"3rd Generation Partnership Project; Technical Specification Group Radio Access Network; Evolved Universal Terrestrial Radio Access (E-UTRA) Radio Resource Control (RRC); Protocol specification(Release 9)", 3GPP TS 36.331,V9.0.0, Sep. 2009, pp. 1-213.

International Search Report and Written Opinion received for corresponding International Patent Application No. PCT/IB2010/050458, dated Nov. 11, 2010, 10 pages.

"3rd Generation Partnership Project;Technical Specification Group Radio Access Network; Evolved Universal Terrestrial Radio Access (E-UTRA) Medium Access Control (MAC) protocol specification(Release 8)", 3GPP TS 36.321, V8.8.0, Dec. 2009, pp. 1-47.

* cited by examiner

APPARATUS AND METHOD FOR REQUESTING UPLINK RADIO RESOURCES

RELATED APPLICATION

This application was originally filed as PCT Application No. PCT/IB2010/050458 filed Feb. 2, 2010.

TECHNICAL FIELD

Example embodiments of the present invention generally relate to communication technology, and more particularly, relate to an apparatus and method for requesting uplink radio resources from a network.

BACKGROUND

The modern communications era has brought about a tremendous expansion of wireline and wireless networks. Computer networks, television networks and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. In this regard, wireless communication has become increasingly popular in recent years due, at least in part, to reductions in size and cost along with improvements in battery life and computing capacity of mobile electronic devices. As such, mobile electronic devices have become more capable, easier to use, and cheaper to obtain. Due to the now ubiquitous nature of mobile electronic devices, people of all ages and education levels are utilizing mobile terminals to communicate with other individuals or contacts, receive services and/or share information, media and other content.

Current and future networking technologies continue to facilitate ease of information transfer and convenience to users. In order to provide easier or faster information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE) or 3.9G, is aimed at upgrading prior technologies by improving efficiency, lowering costs, improving services, making use of new spectrum opportunities, and providing better integration with other open standards.

In one example network configuration, mobile users communicate via the network with network applications or other mobile users. The mobile user may request uplink radio resources from the network, for example to initiate a "traditional" phone call or for protocol signaling between the user equipment and the network. The user equipment may request uplink radio resources through a Scheduling Request; however, when a network does not have resources available to allocate to the user equipment, the user equipment may resort to using a Random Access procedure to access uplink resources which is less efficient and slower than Scheduling Request uplink resources.

BRIEF SUMMARY

A method, apparatus, and computer program product are therefore provided for increasing the probability that a user equipment device will attain uplink resources through Scheduling Requests rather than through a Random Access procedure.

In one embodiment of the present invention, a method is provided that includes providing for transmission of a first scheduling request for uplink resources and incrementing an alert counter in response. The method may also include determining if uplink resources have been received in response to the first scheduling request. In response to uplink resources not being received, providing for transmission of a second scheduling request for uplink resources and incrementing the alert counter. The method may further include providing for transmission of an indication that the alert counter has reached an alert counter threshold. The alert counter may be reset in response to receiving dummy uplink resources which may also increment a reset counter. The method may further initiate a random access uplink procedure in response to the reset counter exceeding a reset counter threshold. The method may preclude transmission of a scheduling request in response to receiving uplink resources. The method may also provide for transmission of the alert counter value. Additionally, the method may include receiving the alert threshold value in response to providing for transmission of the first scheduling request.

According to another embodiment of the invention, an apparatus is provided that includes at least one processor and at least one memory including computer program code. The at least one memory and the computer program code are configured to, with the at least one processor, cause the apparatus to provide for transmission of a first scheduling request for uplink resources and incrementing an alert counter. The apparatus may further be caused to determine if uplink resources have been received in response to the first scheduling request, and if not, provide for transmission of a second scheduling request for uplink resources and increment the alert counter. The apparatus may be further caused to provide for transmission of an indication that the alert counter has reached an alert counter threshold. The apparatus may be caused to reset the alert counter in response to receiving dummy uplink resources and a reset counter may be incremented in response to resetting the alert counter. The apparatus may initiate a random access uplink procedure in response to the reset counter exceeding a reset counter threshold. The apparatus may further be caused to preclude transmission of a scheduling request in response to receiving uplink resources. The apparatus may be caused to provide for transmission of the alert counter value and the apparatus may receive the alert threshold value in response to providing for transmission of the first scheduling request.

According to yet another embodiment of the invention, a computer program product is provided that includes at least one computer-readable storage medium having computer-executable program code instructions stored therein. The computer-executable program code instructions of this embodiment include program code instructions for providing for transmission of a first scheduling request for uplink resources and incrementing an alert counter. The computer-executable program code instructions may further include instructions for determining if uplink resources have been received in response to the first scheduling request, and if not, providing for transmission of a second scheduling request for uplink resources and incrementing the alert counter. The program code instructions may further include program code for providing for an indication that the alert counter has reached an alert counter threshold. The program code instructions may further include program code for resetting the alert counter in response to receipt of dummy uplink resources and incrementing a reset counter in response to resetting the alert counter. The program code instructions may further include program code for initiating a random access uplink procedure in response to the reset counter exceeding a reset counter threshold. Program code instructions may be included that provide for transmission of the alert counter value and program code instructions for receiving the alert threshold value in response to providing for transmission of the first scheduling request.

According to still another embodiment of the present invention, an apparatus is provided that includes at least one processor and at least one memory including computer program code. The at least one memory and the computer program code are configured to, with the at least one processor, cause the apparatus to receive a first scheduling request for uplink resources. The apparatus may further provide for transmission of dummy uplink allocation resources in response to no uplink allocation resources being available to satisfy the scheduling request for uplink resources. The apparatus may provide for transmission of uplink allocation resources in response to uplink allocation resources being available to satisfy the scheduling request for uplink resources. The scheduling request may be from a device and include an indication of how many requests have been transmitted from the device. The dummy uplink allocation resources may be transmitted if no uplink allocation resources are available to satisfy the request and the indication of how many requests have been transmitted from the device exceeds a predetermined threshold. The apparatus may include a counter that indicates the number of scheduling requests for uplink services that have originated from a particular device and the transmission of dummy uplink allocation resources may occur in response to no uplink allocation resources being available to satisfy the request and the counter exceeding a predetermined threshold.

In one embodiment of the present invention, a method is provided that includes receiving a scheduling request for uplink resources and providing for transmission of dummy uplink allocation resources in response to no uplink allocation resources being available to satisfy the scheduling request for uplink resources. The method may further include providing for transmission of uplink allocation resources in response to uplink allocation resources being available to satisfy the scheduling request for uplink resources. The scheduling request for uplink resources may be from a device and may include an indication of how many requests have been transmitted from the device. The transmission of dummy uplink allocation resources may be performed in response to no uplink allocation resources being available to satisfy the scheduling request for uplink resources and the indication of how many requests have been transmitted from the device exceeds a predetermined threshold. The method may further include incrementing a counter that indicates the number of scheduling requests for uplink services that have originated from a particular device and providing for transmission of dummy uplink allocation resources may occur in response to no uplink allocation resource being available to satisfy the request and the counter exceeding a predetermined threshold.

According to yet another embodiment of the invention, a computer program product is provided that includes at least one computer-readable storage medium having computer-executable program code instructions stored therein. The computer-executable program code instructions of this embodiment include program code instructions for receiving a scheduling request for uplink resources, program code for providing for transmission of dummy uplink allocation resources in response to no uplink allocation resources being available to satisfy the scheduling request for uplink resources, and program code for providing for transmission of uplink allocation resources in response to uplink allocation resources being available to satisfy the scheduling request for uplink resources. The scheduling request for uplink resources may be from a device and includes an indication of how many requests have been transmitted from the device. The program code for providing for transmission of dummy uplink allocation resources may be executed in response to no uplink allocation resources being available to satisfy the scheduling request for uplink resources and the indication of how many requests have been transmitted from the device exceeding a predetermined threshold. The computer program product may include program code instructions for incrementing a counter that indicates the number of scheduling requests for uplink resources that have originated from a particular device. The program code instructions for providing for transmission of dummy uplink allocation resources may be executed in response to no uplink allocation resources being available to satisfy the request and the counter exceeding a predetermined threshold.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
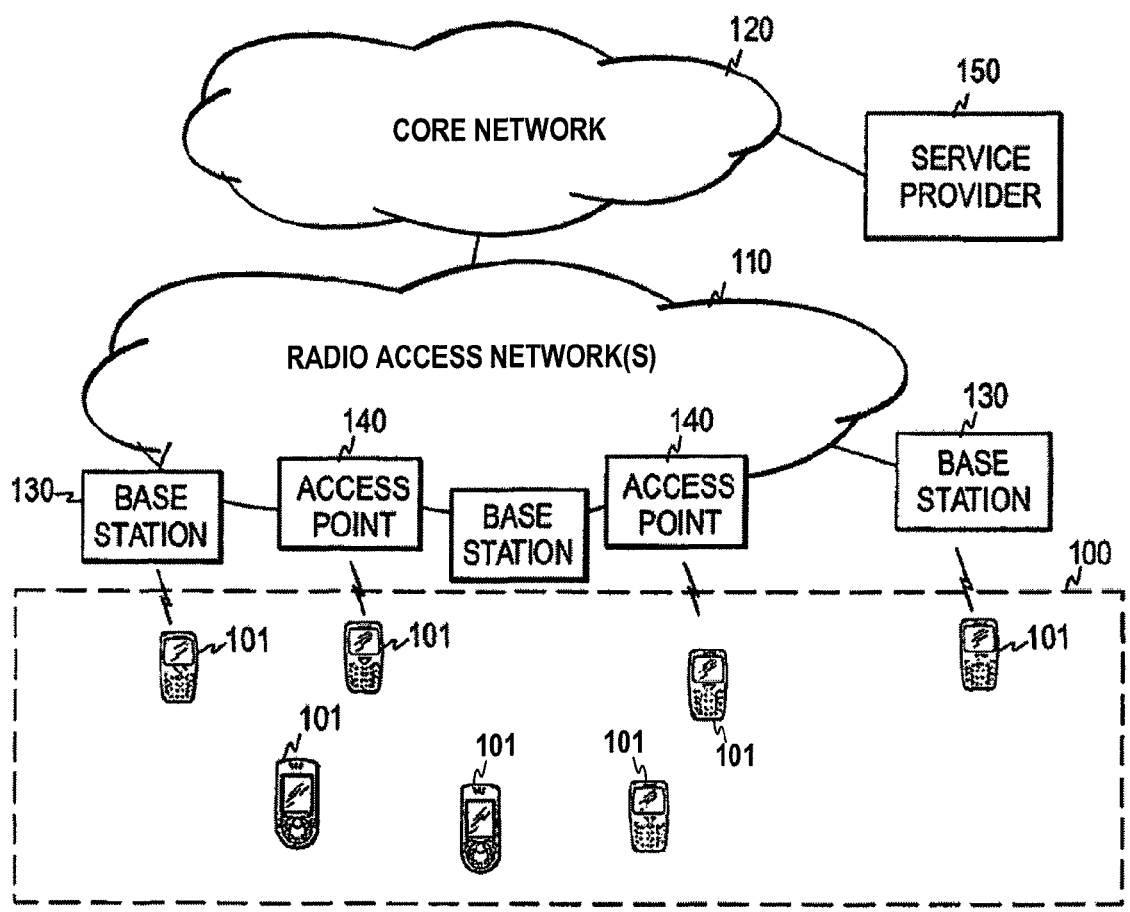
FIG. 1 illustrates a general communication environment according to example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like. The terms "data", "content", "information" and similar terms may be used interchangeably, according to some example embodiments of the present invention, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

FIG. 1 illustrates a general communication environment in which example embodiments of the present invention may be applied. The communication environment includes three interacting domains: a user equipment domain 100, an access domain including several radio access networks 110, and a backbone domain including a core network 120.

The above communication environment may include a mobile network and one or more short-range wireless networks, and may therefore include one or more base stations 130 (or node B elements), access points 140 or the like. Examples of these networks may include 3GPP radio access networks, Universal Mobile Telephone System (UMTS) radio access networks UTRAN (Universal Terrestrial Radio Access Network), Global System for Mobile Communications (GSM) radio access networks, Code Division Multiple Access (CDMA) 2000 radio access networks, Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, infrared (IrDA), ultra wideband (UWB), Wibree, Zigbee or the like. 3GPP radio access networks may include, for example, 3G or 3.9G (also referred to as UTRAN Long Term Evolution (LTE) or Super 3G) or E-UTRAN (Evolved UTRAN) networks. Generally, a radio access network may refer to any 2G, 3G, 4G or higher generation mobile communication network and their different versions, radio frequency (RF) or any of a number of different wireless networks, as well as to any other wireless radio access network that may be arranged to interwork with such networks.

The user equipment domain 100 may include a plurality of user equipment (UE) 101, including mobile terminals or the like. In this context, the user equipment may be multimode user equipment. Multimode user equipment may here refer to user equipment that has at least two operation modes, i.e., at least two radio interfaces based on different connectivity standards. Although one operation mode may be provided for communicating with the mobile network, the user equipment may also be provided with one or more other operation modes, in which a short-range radio of the user equipment may be active. The user equipment may have different states with respect to each operation mode, and the states allowed concurrently depend on the implementation of the user equipment.

The radio access network 110 and/or core network 120 may further be connected to one or more external networks, such as the Internet. The core network and/or the external network may include one or more service providers 150 to provide respective services to other apparatuses such as the user equipment 101.

Figure 2:
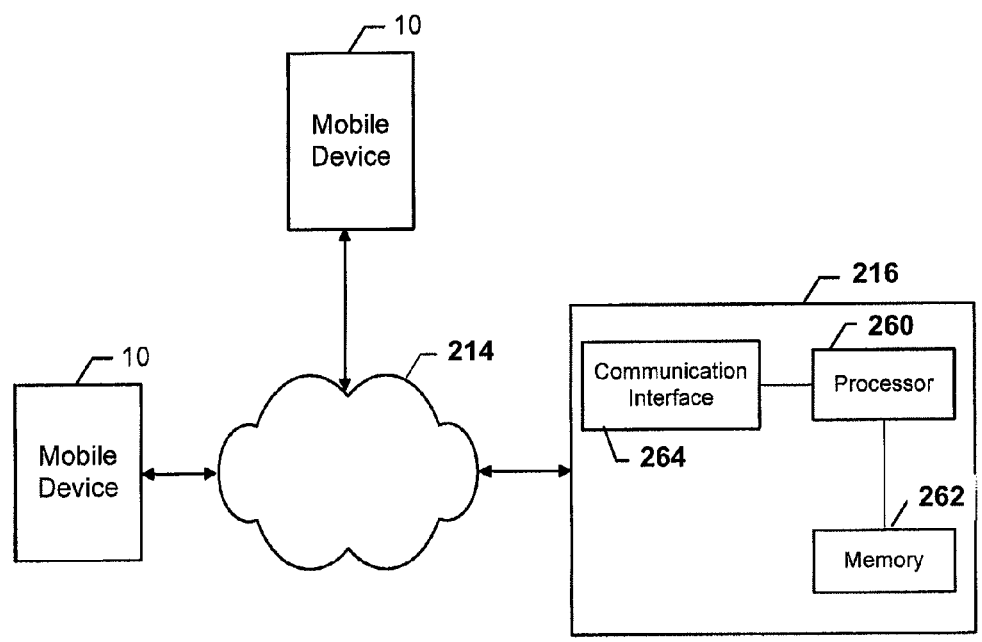
FIG. 2 is a schematic representation of a system for supporting embodiments of the present invention.

As shown in FIG. 2, a block diagram of a network entity 216 capable of operating as a server or the like is illustrated in accordance with one embodiment of the present invention. The network entity may include various means for performing one or more functions in accordance with embodiments of the present invention, including those more particularly shown and described herein. It should be understood, however, that the network entity may include alternative means for performing one or more like functions, without departing from the spirit and scope of the present invention.

In the illustrated embodiment, the network entity 216 includes means, such as a processor 260, for performing or controlling its various functions. The processor may be embodied in a number of different ways. For example, the processor may be embodied as various processing means such as processing circuitry, a coprocessor, a controller or various other processing devices including integrated circuits such as, for example, an application-specific integrated circuit (ASIC), a field-programmable gate array (FPGA), a hardware accelerator, and/or the like. In an example embodiment, the processor is configured to execute instructions stored in memory or otherwise accessible to the processor. As such, whether configured by hardware or software methods, or by a combination thereof, the processor 260 may represent an entity capable of performing operations according to embodiments of the present invention while specifically configured accordingly.

In one embodiment, the processor 260 is in communication with or includes memory 262, such as volatile and/or non-volatile memory that stores content, data or the like. For example, the memory may store content transmitted from, and/or received by, the network entity. Also for example, the memory may store software applications, instructions or the like for the processor to perform operations associated with operation of the network entity 216 in accordance with embodiments of the present invention. In particular, the memory may store software applications, instructions or the like for the processor to perform the operations described above and below with regard to FIG. 6.

In addition to the memory 262, the processor 260 may also be connected to at least one interface or other means for transmitting and/or receiving data, content or the like. In this regard, the interface(s) can include at least one communication interface 264 or other means for transmitting and/or receiving data, content or the like, such as between the network entity 216 and the mobile device 10 and/or between the network entity and the remainder of network 214.

Figure 3:
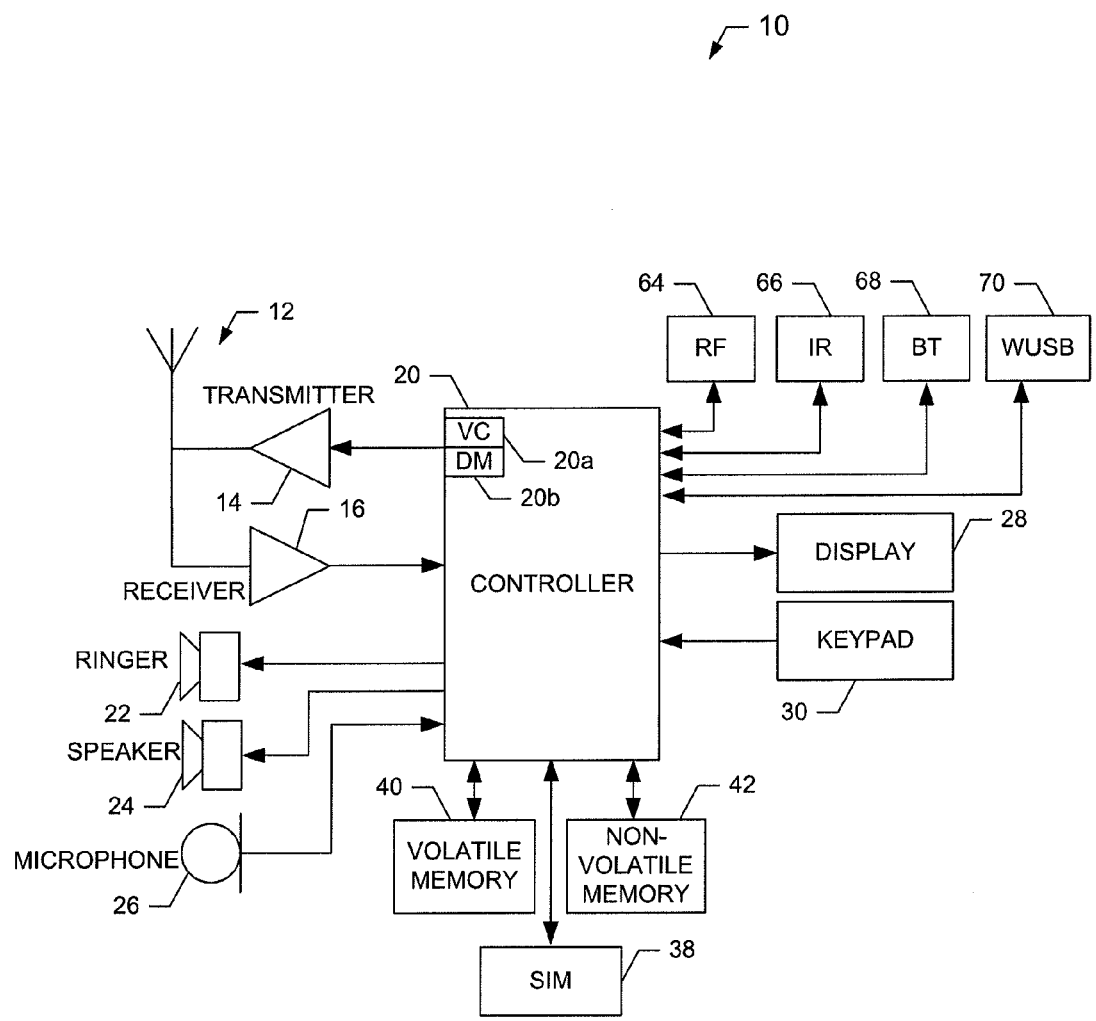
FIG. 3 illustrates an apparatus that may be configured to operate within the network architecture of FIG. 1, according to various example embodiments of the present invention.

In this regard, FIG. 3 illustrates a block diagram of a mobile terminal 10 in accordance with embodiments of the present invention. It should be understood, however, that the mobile terminal 10 illustrated and hereinafter described is merely illustrative of one type of UE that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, processing circuitry, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 3, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.16 techniques, and/or the like. The mobile terminal 10 may comprise memory, such as a subscriber identity module (SIM) 38, a universal subscriber identity module (USIM), a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

In mobile networks there are specified procedures for how a user equipment device, such as the mobile terminal 10 of FIG. 3, requests uplink radio resources from a network. The request for uplink radio resources may be triggered or initiated by a number of reasons by the user equipment device, such as when a user of the user equipment wants to initiate a traditional voice phone call or for protocol signaling between the user equipment and the network that may occur when the user equipment updates its location to the network. The request may be sent repeatedly until the desired response is received. According to the EUTRAN standard, time may be divided into increments known as Transmission Time Intervals (TTIs). During each TTI, the user equipment may transmit or receive one or more transport blocks. EUTRAN presently uses two alternative procedures for the user equipment to request the uplink radio resources at the Media Access Control (MAC) layer including the Random Access procedure and the Scheduling Request procedure.

The Random Access procedure is used when the user equipment does not have valid uplink timing, e.g., the user equipment is unaware of the signal propagation delay from the user equipment to the network. When there is signal propagation delay between the user equipment and the network, the user equipment must make requests for uplink resources in advance; however, since the propagation delay is of unknown duration, the user equipment cannot properly schedule a request for uplink resources. The Random Access procedure is relatively slow and, in some cases, there may be collisions between user equipment requests and since the request is unscheduled with the network, the user equipment must always verify the user equipment ID with a Random Access request.

The Scheduling Request procedure is signaled to the network on the Physical Uplink Control Channel (PUCCH). The Scheduling Request procedure may be used when the user equipment has valid uplink synchronization and the network has previously signaled the user equipment parameter for PUCCH and the Scheduling Request. As the request is scheduled and the user equipment includes a parameter for PUCCH, no additional user equipment identifier is required. The Scheduling Request procedure is more reliable and generally faster than the Random Access procedure, thus it is the more desirable procedure for use.

Presently in EUTRAN, a user equipment device will initially trigger an attempt a Scheduling Request procedure when requesting uplink resources for initiating a phone call or browsing a website among other activities. Once the attempt is triggered, for each TTI the user equipment will, if no uplink resources were allocated in this TTI and the Scheduling Request has been mapped on PUCCH, instruct the physical layer to signal the Scheduling Request on PUCCH. However, if no uplink resources were allocated in this TTI and the Scheduling Request has not been mapped on PUCCH, the user equipment will instruct the Random Access procedure to initiate a Random Access procedure, per 3GPP TS 36.321 V8.0.0, chapter 5.4.4. The user equipment has a maximum number of attempts for sending a Scheduling Request to a network before the user equipment stops sending a Scheduling Request and initiates the Random Access procedure.

If a network has a temporary overload situation with respect to uplink resources and resources are not available to allocate for the request of a user equipment device, the Random Access procedure will be initiated. The Random Access procedure may be time consuming and may lead to undesirable delays in attaining the requested uplink resources.

Figure 4:
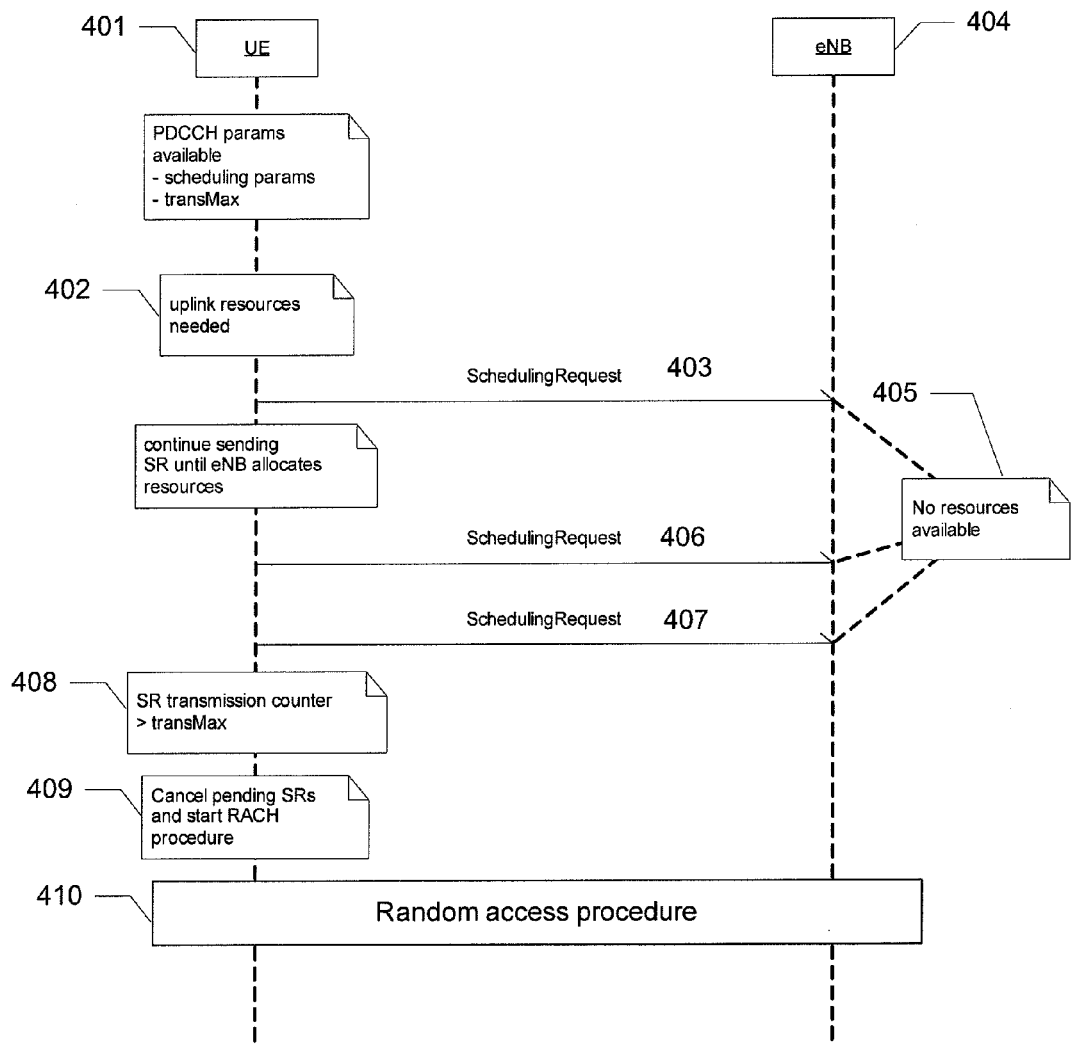
FIG. 4 illustrates the message flow of a method according to an example embodiment of the prior art.

An example embodiment of an existing method of satisfying uplink resource requests is illustrated in FIG. 4, in which the User Equipment (UE, 401) includes Physical Downlink Control Channel (PDCCH) parameters, scheduling parameters, and transMax which is the maximum number of attempts the user equipment is configured to try a Scheduling Request before resorting to Random Access procedure. At 402, the UE triggers a need for uplink resources. The Scheduling Request is sent at 403 and received by the network at, for example as illustrated, a base transceiver station (e.g., EUTRAN Node B or eNB) 404. The eNB either responds that there are no available uplink resources, or fails to respond at all to indicate that there are no available uplink resources at 405 while the UE waits the TTI before sending another Scheduling Request at 406. In the illustrated embodiment, the eNB continues to respond indicating there are no available resources or continues to fail to respond while no uplink resources are available for the UE. Meanwhile, the UE continues to send a Scheduling Request at 407 every TTI until the number of Scheduling Requests attempted exceeds the maximum number of attempts at 408. The UE then proceeds to cancel the Scheduling Requests at 409 and initiates the Random Access procedure (RACH) at 410.

Example embodiments of the present invention may implement a reset function for the user equipment's Scheduling Request counter that may otherwise be exceeded and consequently initiate Random Access. The reset function may allow user equipment to continue to send Scheduling Requests after the maximum number of Scheduling Requests has been exceeded, thus reducing a user equipment device resorting to the Random Access procedure. A method according to an example embodiment of the present invention may include a second threshold, hereinafter the "alert threshold", which is lower than the threshold of maximum number of Scheduling Requests and will be satisfied before Random Access is initiated. This alert threshold may cause the network or base station to be alerted that the user equipment is approaching the maximum number of Scheduling Requests, whereupon the network may reset the user equipment Scheduling Request counter, for example, by sending a dummy or pseudo uplink resource. The dummy uplink resource may be a dummy uplink allocation without any assigned resource blocks. The dummy uplink allocation would not trigger any uplink transmissions, but it would restart the Scheduling Request counter of the user equipment. Alternatively, the alert threshold may be maintained by the network such that the Scheduling Requests that are sent by a user equipment device include the number of attempts at the Scheduling Request, which are then compared to the alert threshold maintained at the network to determine if a user equipment device will imminently resort to the Random Access procedure.

Further example embodiments of the present invention may allow a user equipment device to notify a network when the user equipment's Scheduling Request counter is approaching the maximum number of attempted requests. This may be performed by using the alert threshold previously discussed whether the alert threshold is maintained by the user equipment device or by the network. By notifying the network of the imminent maximum request threshold or the network acknowledging this through the number of Scheduling Request attempts from a user equipment device, the network may be able to prioritize requests for uplink resources and allocate available resources to those user equipment devices that may be indicating that they will imminently resort to the Random Access procedure. Further, as the network is aware of the imminent maximum request threshold, the network may respond to the user equipment's request with an a dummy uplink resource to reset the Scheduling Request attempt counter to permit additional Scheduling Request attempts, increasing the likelihood of a Scheduling Request uplink.

Embodiments of the present invention may include an additional threshold for the maximum number of times a Scheduling Request attempt counter may be reset. This additional threshold may allow a device to proceed to using the Random Access Procedure as opposed to potentially continuing to send Scheduling Requests in perpetuity. A reset counter may be incremented for every dummy uplink resource received in a particular time frame or during a single triggered uplink request. Upon this counter reaching the maximum reset threshold, the user equipment may resort to the Random Access procedure.

Figure 5:
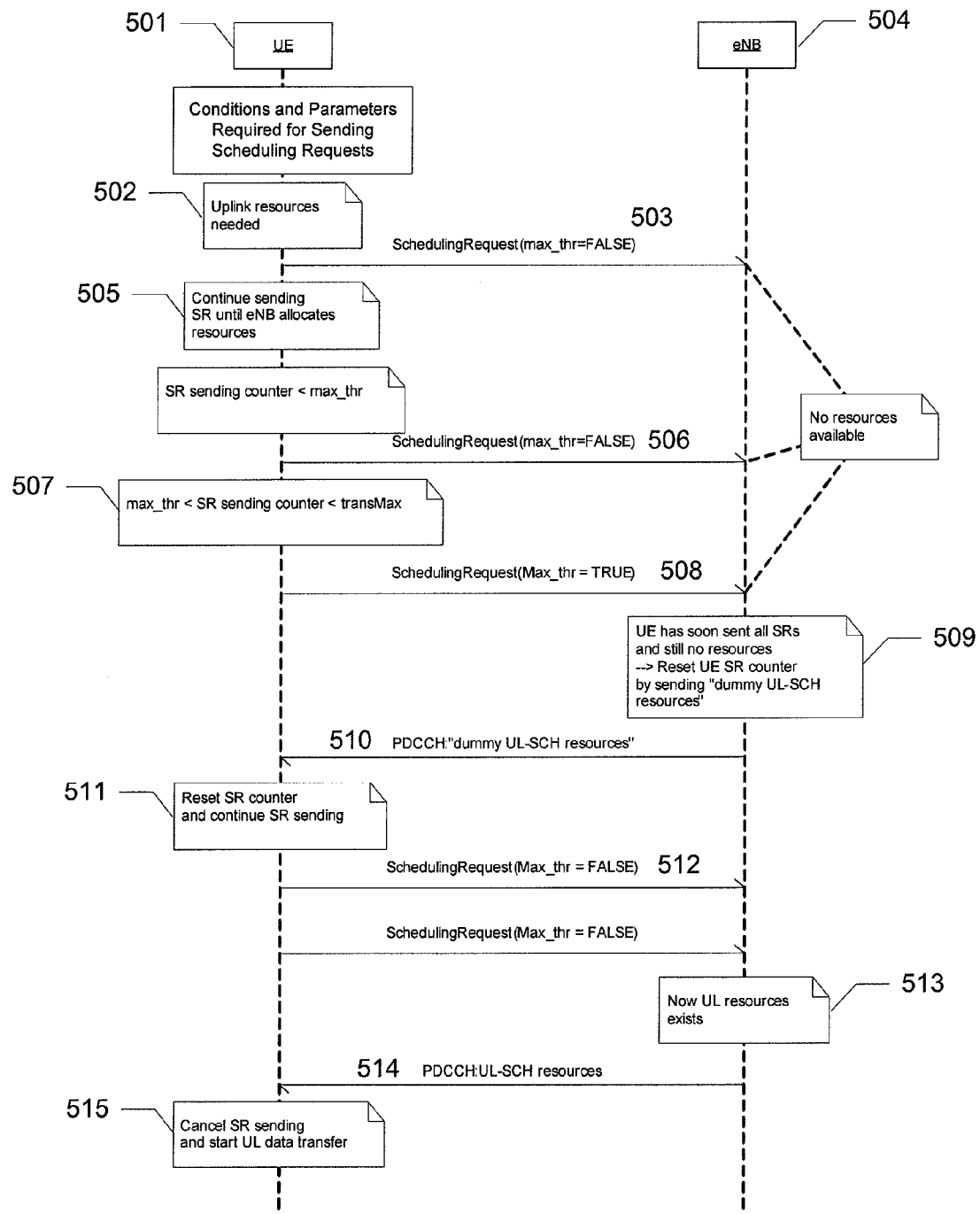
FIG. 5 illustrates the message flow of a method according to an example embodiment of the present invention.

A method according to an example embodiment the present invention for satisfying uplink resource requests is illustrated in FIG. 5. The UE 501 may include the required conditions and parameters for Scheduling Request transmission including the scheduling parameters and the transMax threshold or maximum number of Scheduled Requests to send before resorting to the Random Access procedure. The UE may further include the alert threshold Max_thr above which the network is alerted that the UE is approaching the transMax threshold. When the UE triggers a need for uplink resources at 502, a Scheduling Request is sent at 503 to the eNB 504. While the Scheduling Request attempts are below the alert threshold (max_thr) the requests are treated in a conventional manner. While no uplink resources are available, the UE increments the Scheduled Request counter at 505 and continues to send Scheduling Requests at 506. Once the Scheduling Request attempts exceed the alert threshold (max_thr) at 507, but is below the transMax threshold above which the Random Access procedure is initiated, the UE may transmit a Scheduling Request that indicates that it is approaching the threshold of the maximum number of requests before resorting to Random Access at 508. The eNB may acknowledge that the alert threshold has been reached at 509 and send dummy uplink scheduling (UL-SCH) resources at 510. The UE may then reset the Scheduling Request counter at 511 and begin sending additional Scheduling Requests at 512. When the eNB has uplink resources available at 513, the eNB may send the PDCCH Uplink Scheduling resources at 514. The UE may then discontinue sending Scheduling Requests at 515 and begin use of the uplink resources.

Figure 6:
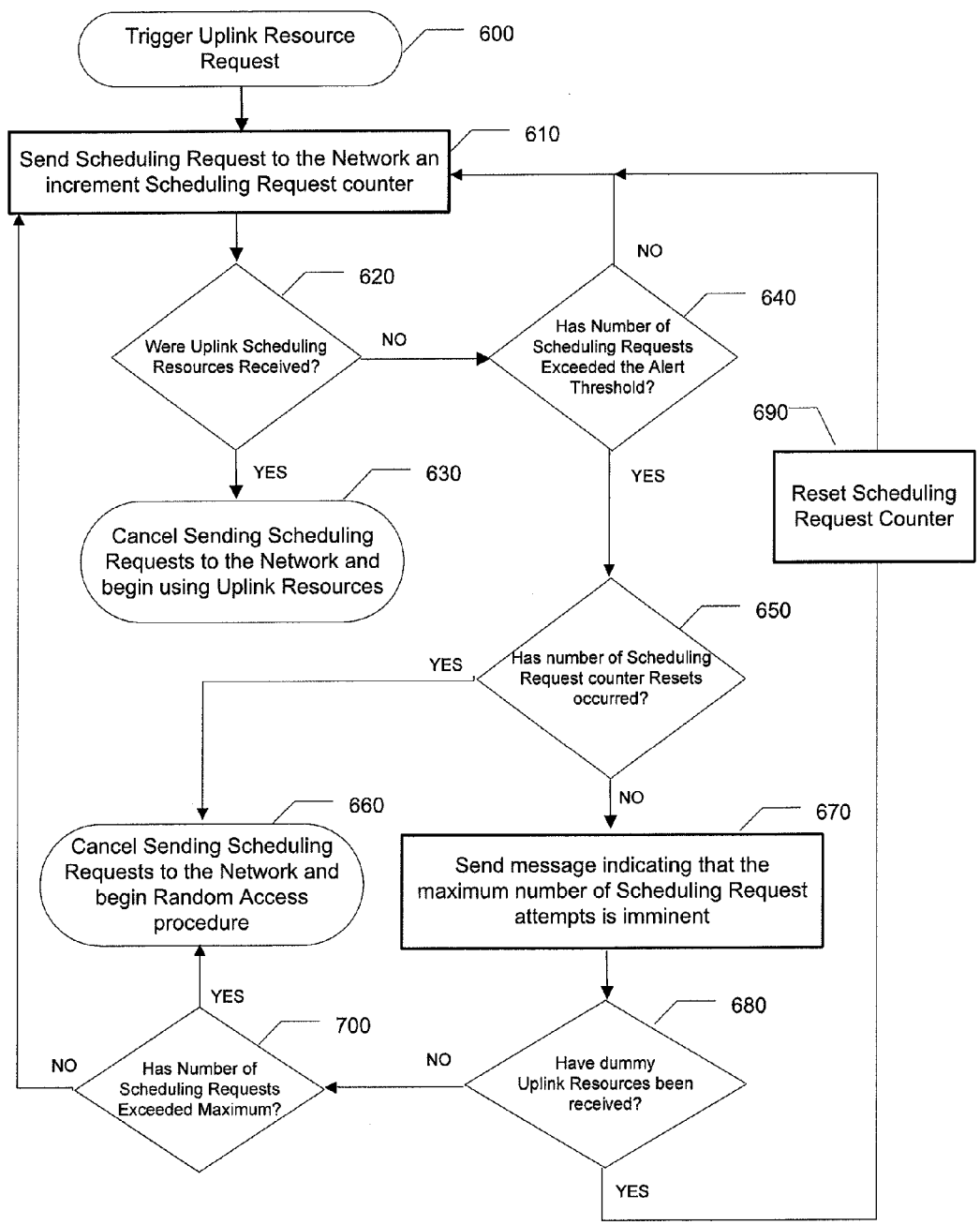
FIG. 6 illustrates a flowchart including various operations in a method of example embodiments of the present invention.

FIG. 6 illustrates a flowchart of a method according to an example embodiment of the present invention. A user equipment device may trigger an uplink resource request at 600 for a variety of reasons, including initiating a phone call, accessing a webpage, etc. As the preferred method of requesting uplink radio resources is Scheduling Requests, a Scheduling Request is sent at 610 and the Scheduling Request counter may be incremented. At 620, the user equipment device may determine if Scheduling Resources were received and, if so, the user equipment device cancels Scheduling Requests and begins using the uplink resources at 630. If Scheduling Resources were not received, the device may determine whether or not an alert threshold has been exceeded by the Scheduling Request counter at 640. If the alert threshold has not been met, another Scheduling Request is sent at 610 and the counter is subsequently incremented at 610. If the alert threshold has been exceeded, the device may determine if the number of Scheduling Request counter resets has been reached at 650. If the maximum number of Scheduling Request counter resets has been exceeded, the device may cancel the Scheduling Requests and begin the Random Access procedure at 660. Otherwise, the device may send a message that indicates the Scheduling Request attempt counter is approaching the maximum number of requests before resorting to the Random Access procedure at 670. This message may be included with a Scheduling Request notifying a recipient of the Scheduling Request that this may be the last Scheduling Request permitted by the maximum attempt threshold. The device may receive in return dummy Uplink Scheduling Resources at 680 that cause the Scheduling Request counter to be reset at 690 before the process may begin again at 610 and, if present, the Scheduling Request reset counter may be incremented. This cycle may continue until either the Uplink Scheduling Resources are received at 620 or the maximum number of Scheduling Request counter resets was reached at 650. If dummy uplink resources are not received at 680, it is determined at 700 whether or not the maximum number of Scheduling Requests has been received before resorting to Random Access. If the maximum number of Scheduling Requests have been sent, then the Scheduling Requests are canceled and the Random Access procedure is begun at 660. If the maximum number of Scheduling Requests have not been sent at 700, another Scheduling Request is sent at 610 to start the process again without resetting the Scheduling Request counter.

According to one aspect of the example embodiments of present invention, the functions performed by the apparatus 10, such as those illustrated by the flowchart of FIGS. 5 and 6, may be performed by various means. It will be understood that each block or operation of the flowchart, and/or combinations of blocks or operations in the flowchart, can be implemented by various means. Means for implementing the blocks or operations of the flowchart, combinations of the blocks or operations in the flowchart, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as the memory device 40 of the example apparatus, and executed by a processor, such as the controller 20 of the example apparatus in order to implement the functions of FIGS. 5 and 6. As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the flowchart's block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowchart's block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowchart's block(s) or operation(s).

Accordingly, execution of instructions associated with the blocks or operations of the flowchart by a processor, or storage of instructions associated with the blocks or operations of the flowchart in a computer-readable storage medium, supports combinations of operations for performing the specified functions. It will also be understood that one or more blocks or operations of the flowchart, and combinations of blocks or operations in the flowchart, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
   at least one processor; and
   at least one memory including computer program code, the at least one memory and the computer program code are configured to, with the at least one processor, cause the apparatus to at least:
   provide for transmission of a first scheduling request for uplink resources;
   increment an alert counter in response to providing for transmission of the first scheduling request;
   determine if uplink resources have been received in response to the first scheduling request;
   provide for transmission of a second scheduling request for uplink resources in response to determining that uplink resources have not been received;
   increment the alert counter in response to providing for transmission of the second scheduling request; and
   provide for transmission of an indication that the alert counter has reached an alert counter threshold.

2. The apparatus of claim 1, further caused to at least reset the alert counter in response to receipt of dummy uplink resources.

3. The apparatus of claim 2, further caused to at least increment a reset counter in response to resetting the alert counter.

4. The apparatus of claim 3, further caused to at least initiate a random access uplink procedure in response to the reset counter exceeding a reset counter threshold.

5. The apparatus of claim 1, further caused to at least preclude transmission of a scheduling request in response to receiving uplink resources.

6. The apparatus of claim 1, further caused to at least provide for transmission of a value of the alert counter.

7. The apparatus of claim 1, further caused to at least receive the alert counter threshold in response to providing for transmission of the first scheduling request.

8. A method comprising:
   providing for transmission of a first scheduling request for uplink resources;
   incrementing an alert counter in response to providing for transmission of the first scheduling request;
   determining if uplink resources have been received in response to the first scheduling request;
   providing for transmission of a second scheduling request for uplink resources in response to determining that the uplink resources have not been received;
   incrementing the alert counter in response to providing for transmission of the second scheduling request; and
   providing for transmission of an indication that the alert counter has reached an alert counter threshold.

9. The method of claim 8, further comprising resetting the alert counter in response to receipt of dummy uplink resources.

10. The method of claim 9, further comprising incrementing a reset counter in response to resetting the alert counter.

11. The method of claim 10, further comprising initiating a random access uplink procedure in response to the reset counter exceeding a reset counter threshold.

12. The method of claim 8, further comprising precluding transmission of a scheduling request in response to receiving uplink resources.

13. The method of claim 8, further comprising providing for transmission of a value of the alert counter.

14. The method of claim 8, further comprising receiving the alert counter threshold in response to providing for transmission of the first scheduling request.

15. A non-transitory computer-readable medium encoded with instructions that, when executed by at least one processor, cause operations comprising:
   providing for transmission of a first scheduling request for uplink resources;
   incrementing an alert counter in response to providing for transmission of the first scheduling request;
   determining if uplink resources have been received in response to the first scheduling request;
   providing for transmission of a second scheduling request for uplink resources in response to determining that the uplink resources have not been received;
   incrementing the alert counter in response to providing for transmission of the second scheduling request; and
   providing for transmission of an indication that the alert counter has reached an alert counter threshold.

16. The non-transitory computer-readable medium of claim 15, further causing operations comprising resetting the alert counter in response to receipt of dummy uplink resources.

17. The non-transitory computer-readable medium of claim 16, further causing operations comprising incrementing a reset counter in response to resetting the alert counter.

18. The non-transitory computer-readable medium of claim 15, further causing operations comprising initiating a random access uplink procedure in response to the reset counter exceeding a reset counter threshold.

19. The non-transitory computer-readable medium of claim 15, further causing operations comprising providing for transmission of the alert counter value.

20. The non-transitory computer-readable medium of claim 15, further causing operations comprising receiving the alert threshold value in response to providing for transmission of the first scheduling request.

* * * * *